United States Patent
Oikawa et al.

(10) Patent No.: US 10,430,627 B2
(45) Date of Patent: Oct. 1, 2019

(54) LABEL CREATING DEVICE, SYSTEM, AND LABEL

(71) Applicant: SEIKO EPSON CORPORATION, Tokyo (JP)

(72) Inventors: Hideki Oikawa, Shiojiri (JP); Seiji Tanaka, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/066,553

(22) PCT Filed: Dec. 6, 2016

(86) PCT No.: PCT/JP2016/086171
§ 371 (c)(1),
(2) Date: Jun. 27, 2018

(87) PCT Pub. No.: WO2017/115619
PCT Pub. Date: Jul. 6, 2017

(65) Prior Publication Data
US 2019/0012501 A1   Jan. 10, 2019

(30) Foreign Application Priority Data

Dec. 28, 2015  (JP) ................................ 2015-256071

(51) Int. Cl.
*G06K 5/00* (2006.01)
*G06K 7/14* (2006.01)
(Continued)

(52) U.S. Cl.
CPC .......... *G06K 7/1417* (2013.01); *B41J 3/4075* (2013.01); *B41J 29/38* (2013.01); *G06K 1/121* (2013.01);
(Continued)

(58) Field of Classification Search
CPC ......... B41J 29/38; B41J 3/4075; G06K 1/121; G06K 7/1417
(Continued)

(56) References Cited

U.S. PATENT DOCUMENTS

2002/0134707 A1\* 9/2002 DeWitt ..................... B07C 3/14
209/3.3
2008/0301982 A1\* 12/2008 Kaufman ............... B42D 15/00
40/310

(Continued)

FOREIGN PATENT DOCUMENTS

JP   2002-024345 A   1/2002
JP   2003-281302 A   10/2003
(Continued)

OTHER PUBLICATIONS

International Search Report dated Jan. 17, 2017 in PCT/JP2016/086171 with English-language translation (4 pages).

*Primary Examiner* — Thien M Le
(74) *Attorney, Agent, or Firm* — Foley & Lardner LLP

(57) ABSTRACT

The label creating device is configured to image the article and generate code information including first characteristic information indicating a characteristic of the article and first identification information associated with the article. The label creating device is configured to create the label on which the code information is printed. The information device is configured to image the article and the code information, to extract the first characteristic information and the first identification information from the code information, to analyze the characteristic of the article, to generate the second characteristic information, and to acquire the second identification information used for determining the first identification information. The information device is configured to determine whether the first characteristic information and the second characteristic information match (Continued)

each other, and whether the first identification information and the second identification information match each other.

4 Claims, 9 Drawing Sheets

(51) Int. Cl.

| | |
|---|---|
| *G06Q 30/00* | (2012.01) |
| *B41J 3/407* | (2006.01) |
| *B41J 29/38* | (2006.01) |
| *G06K 1/12* | (2006.01) |
| *G06K 19/06* | (2006.01) |
| *G06K 19/08* | (2006.01) |
| *G06K 19/10* | (2006.01) |

(52) U.S. Cl.
CPC . *G06K 19/06028* (2013.01); *G06K 19/06037* (2013.01); *G06K 19/083* (2013.01); *G06K 19/10* (2013.01); *G06Q 30/00* (2013.01)

(58) Field of Classification Search
USPC .......................................................... 235/380
See application file for complete search history.

(56) References Cited

U.S. PATENT DOCUMENTS

| | | | |
|---|---|---|---|
| 2009/0033950 A1* | 2/2009 | Studer | B41J 2/16535 358/1.1 |
| 2014/0092409 A1* | 4/2014 | Ito | G06F 3/1204 358/1.11 |
| 2015/0262194 A1* | 9/2015 | Dunlop | G06Q 30/0185 705/318 |
| 2016/0342857 A1* | 11/2016 | Simske | G06K 9/4671 |
| 2017/0091705 A1* | 3/2017 | Jones | G06K 9/228 |
| 2018/0155075 A1* | 6/2018 | Omer | B65C 11/004 |
| 2018/0293411 A1* | 10/2018 | Becker | B41M 5/0023 |

FOREIGN PATENT DOCUMENTS

| | | |
|---|---|---|
| JP | 2006-229852 A | 8/2006 |
| JP | 2009-110471 A | 5/2009 |
| JP | 2010-081039 A | 4/2010 |
| JP | 2015-091102 A | 5/2015 |

* cited by examiner

LABEL CREATING DEVICE, SYSTEM, AND LABEL

TECHNICAL FIELD

The present invention relates to a label creating device, a system, and a label.

BACKGROUND ART

Services are available in which a customer sends merchandise such as a souvenir the customer has purchased in a travel destination while traveling to the customer's house through Takkyubin (registered trademark), which is a door-to-door parcel delivery service or similar. In such services, however, wrong items are sometimes delivered to the customers in accident. This is because of mixing up items at a delivery source or sending to a wrong address, or encountering a trouble on a distribution route. A customer carefully selected an item while traveling and waits for such an item selected by themselves to be delivered to their house, but there is no way to confirm that the delivered item is truly selected by themselves.

To articles such as agricultural products or local specialties, a production district label for identifying a production district is attached. A large number of production district labels are printed in advance, such print labels may be independently distributed. Therefore, acceleration of so-called "forged production district" is concerned.

To address such an issue, in PTL 1, the technique is disclosed in which a plurality of random number sequences are printed on a label and the printed label is checked to verify the authenticity of the label attached to an article. In addition, in PTL 2, the technique is disclosed in which Global Positioning System (GPS) information on a specific node on the distribution route is printed as a digital watermark on the label. The digital watermark and the node information are checked to determine a correct distribution route and the authenticity.

CITATION LIST

Patent Literature

PTL 1: JP-A-2003-281302
PTL 2: JP-A-2015-091102

SUMMARY OF INVENTION

Technical Problem

However, the techniques disclosed in the above-described PTL 1 and PTL 2 are directed to the verification of the the authenticity of the label, but are not directed to verify the authenticity of a target article to which the label is attached. The verify the authenticity of the target article is to make sure that the item that has been delivered to the customer's house, etc., is the article that has been selected by the customer, or the article is a product harvested in the production district as described in the production district label. By the techniques disclosed in the above-described PTL 1 and PTL 2, for example, even in a case where the created label is attached to another article different from the target article, the delivered item may be determined to be a genuine one in the verification of the authenticity.

In both of the systems according to the techniques disclosed in the above-described PTL 1 and PTL 2, a server connected to a network is adopted for verifying the authenticity of the labels. In such systems, costs are increased for implementing and operating the systems.

Solution to Problem

An advantage of some aspects of the present invention is to address at least a part of the above-described issues and provide a system configured to verify the identity of an article through the medium of a label with high reliability. The present invention is achieved as the following embodiments or application examples.

Application Example 1

A system according to Application Example 1 is configured to verify an identity of an article and includes a label creating device configured to create a label associated with the article, and an information device configured to acquire information used for verifying the identity of the article from a content of the label. The label creating device includes an imaging unit configured to image a first subject including the article, and to acquire first image data of the first subject, a first analyzer configured to analyze a characteristic of the article in the first subject by using the first image data, and to generate first characteristic information, a first identification information acquiring unit configured to acquire first identification information associated with the article and used for identifying the article, a generator configured to generate code information including at least the first characteristic information and the first identification information, and a printing unit configured to print the code information on a label medium, and to output the label. The information device includes a device imaging unit configured to image a second subject including the article and the code information, and to output second image data, an extracting unit configured to extract the first characteristic information and the first identification information from the image data of the code information of the second subject included in the second image data, a second analyzer configured to analyze a characteristic of the article of the second subject by using the second image data, and to generate the second characteristic information, a second identification information acquiring unit configured to acquire second identification information to be checked with the first identification information extracted by the extracting unit, a characteristic information determining unit configured to determine whether the first characteristic information and the second characteristic information match each other, an identification information determining unit configured to determine whether the first identification information extracted by the extracting unit and the second identification information acquired by the second identification information acquiring unit match each other, and a display controller configured to control a display to display a determination result determined by the characteristic information determining unit and the identification information determining unit.

According to Application Example 1, the label creating device in the system prints the code information including the first characteristic information and the first identification information on the label medium and creates the label. The first characteristic information represents a characteristic of the article. The first identification information is associated with the article and used for identifying the article.

In the information device, whether the first characteristic information extracted from the code information and the second characteristic information obtained by analyzing the article match each other is determined. In a case where they are determined to match each other, the article targeted when creating the label is determined to be identical in the information device. Therefore, the identity of the article is verified through the medium of the label.

In the information device in the system, whether the first identification information extracted from the code information and the second identification information acquired in the information device match each other is determined. In addition to the above-described determination with the characteristic information, performing determination with the identification information associated with the article and used for identifying the article will increase the reliability in the identification. For example, the first identification information is set as the information known by the customer alone who has selected the article, and thus no new label can be created when the customer is not involved. Even in a case where it is created, it does not match in determination with the identification information. Therefore, the identity of the article is verified through the medium of the label with high reliability.

In addition, because the authenticity is verified through the medium of the label, no server system configured on a network is adopted. Therefore, it is not liable to increase a cost on a system construction or server operation management for implementing and operating the system.

Application Example 2

A system according to Application Example 2 is configured to verify an identity of an article and includes a label creating device configured to create a label associated with the article, an information device configured to acquire information used for verifying the identity of the article from a content of the label. The label creating device includes a location information acquiring unit configured to acquire location information of a place where the label is created, an imaging unit configured to image a first subject including the article, and to acquire first image data of the first subject, a first analyzer configured to analyze a characteristic of the article in the first subject by using the first image data, and to generate first characteristic information, a first identification information acquiring unit configured to acquire first identification information associated with the article and used for identifying the article, a generator configured to generate code information including at least the location information and the first characteristic information and the first identification information, and a printing unit configured to print the code information on a label medium, and to output the label. The information device includes an device imaging unit configured to image a second subject including the article and the code information and output second image data, an extracting unit configured to extract the location information, the first characteristic information, and the first identification information from the image data of the code information of the second subject included in the second image data, a second analyzer configured to analyze a characteristic of the article of the second subject by using the second image data and generate the second characteristic information, a second identification information acquiring unit configured to acquire second identification information used for collation and determination with respect to the first identification information extracted by the extracting unit, a production district determining unit configured to acquire geographical information based on the location information and determine whether the geographical information matches the production district of the article, a characteristic information determining unit configured to determine whether the first characteristic information and the second characteristic information match each other, an identification information determining unit configured to determine whether verify the first identification information extracted by the extracting unit and the second identification information acquired by the second identification information acquiring unit match each other, and a display controller configured to control a display to display a determination result determined by the characteristic information determining unit and the identification information determining unit.

According to Application Example 2, the label creating device in the system prints the code information including the location information, the first characteristic information, and the first identification information on the label medium and creates the label. The first characteristic information represents a characteristic of the article. The first identification information is associated with the article and used for identifying the article. The location information is the information of a place where the label is created.

In the information device, whether the first characteristic information extracted from the code information and the second characteristic information obtained by analyzing the article match each other is determined. In a case where they are determined to match each other, the article targeted when creating the label is determined to be identical in the information device. Therefore, the identity of the article is verified through the medium of the label.

In the information device in the system, whether the first identification information extracted from the code information and the second identification information acquired in the information device match each other is determined. In addition to the above-described determination with the characteristic information, performing determination with the identification information associated with the article and used for identifying the article will increase the reliability in the identification. For example, the first identification information is set as the information known by the customer alone who has selected the article, and thus no new label can be created when the customer is not involved. Even in a case where it is created, it does not match in determination with the identification information. Therefore, the identity of the article is verified through the medium of the label with high reliability.

The information device extracts the location information from the code information, acquires the geographical information based on the location information, and determines the production district of the article. Therefore, whether the article is harvested in the production district as described in the production district label is determined.

Application Example 3

A label creating device according to Application Example 3 is configured to create a label associated with an article. The label creating device includes a device imaging unit configured to image a first subject including the article, and to acquire first image data of the first subject, a first analyzer configured to analyze a characteristic of the article in the first subject by using the first image data, and to generate first characteristic information, a first identification information acquiring unit configured to acquire first identification information associated with the article and used for identifying the article, a generator configured to generate code information including at least the first characteristic information and the first identification information, and a printing unit configured to arrange and print the code information on a label medium, and to output the label.

According to Application Example 3, the label creating device prints the code information including the first characteristic information and the first identification information on the label medium and creates the label. The first characteristic information represents a characteristic of the article. The first identification information is associated with the article and used for identifying the article.

In the label created by the label creating device, the first characteristic information of the article is included. Therefore, the article targeted when creating the label is determined to be identical.

In the label, the first identification information of the article is included. This configuration increases the reliability in verification of the article. Therefore, the identity of the article is verified through the medium of the label with high reliability.

Application Example 4

A label creating device according to Application Example 4 is configured to create a label associated with an article. The label creating device includes a location information acquiring unit configured to acquire location information of a place where the label is created, a device imaging unit configured to image a first subject including the article, and to acquire first image data of the first subject, a first analyzer configured to analyze a characteristic of the article in the first subject by using the first image data, and to generate first characteristic information, a first identification information acquiring unit configured to acquire first identification information associated with the article and used for identifying the article, a generator configured to generate code information including at least the location information, the first characteristic information, and the first identification information, and a printing unit configured to arrange and print the code information on a label medium, and to output the label.

According to Application Example 4, the label creating device prints the code information including the location information, the first characteristic information, and the first identification information on the label medium and creates the label. The first characteristic information represents a characteristic of the article. The first identification information is associated with the article and used for identifying the article. The location information is the information of a place where the label is created.

In the label created by the label creating device, the first characteristic information of the article is included. Therefore, the article targeted when creating the label is determined to be identical.

In the label, the first identification information of the article is included. This configuration increases the reliability in verification of the article. Therefore, the identity of the article is verified through the medium of the label with high reliability.

In the label, the location information is included, therefore, the production district information is acquired based on the location information when the label is created. Therefore, whether the article is harvested in the production district as described in the production district label is determined.

Application Example 5

A label according to Application Example 5 is associated with an article. Code information is printed on a label medium, the code information including at least first characteristic information indicating a characteristic of the article, and first identification information associated with the article and used for identifying the article.

According to Application Example 5, on the label, the code information including the first characteristic information and the first identification information is printed. The first characteristic information represents a characteristic of the article. The first identification information is associated with the article and used for identifying the article.

In the label, the first characteristic information of the article is included. Therefore, the article targeted is determined to be identical.

In the label, the first identification information of the article is included. This configuration increases the reliability in verification of the article.

Therefore, the authenticity of a target article to which a label is attached is verified with the label.

Application Example 6

A label according to Application Example 6 is associated with an article. Code information is printed on a label medium, the code information including at least location information of a place where the label is created, first characteristic information indicating a characteristic of the article, and first identification information associated with the article and used for identifying the article.

According to Application Example 6, on the label, the code information including the first characteristic information, the location information, and the first identification information is printed. The first characteristic information represents a characteristic of the article. The first identification information is associated with the article and used for identifying the article. The location information is the information of a place where the label is created.

In the label, the first characteristic information of the article is included. Therefore, the article targeted is determined to be identical.

In the label, the first identification information of the article is included. This configuration increases the reliability in verification of the article.

Therefore, the authenticity of a target article to which a label is attached is verified with the label.

In the label, the location information is included, therefore, the production district information is acquired based on the location information when the label is created.

Therefore, whether the article is harvested in the production district as described in the production district label is determined.

Application Example 7

A label according to Application Example 7 is the label medium according to the above-described application examples, in which the label medium is a duplication preventing tape configured to prevent duplication.

According to Application Example 7, duplication of the label is difficult and thus fraudulent duplication of the label is prevented.

DESCRIPTION OF EMBODIMENTS

Figure 1:
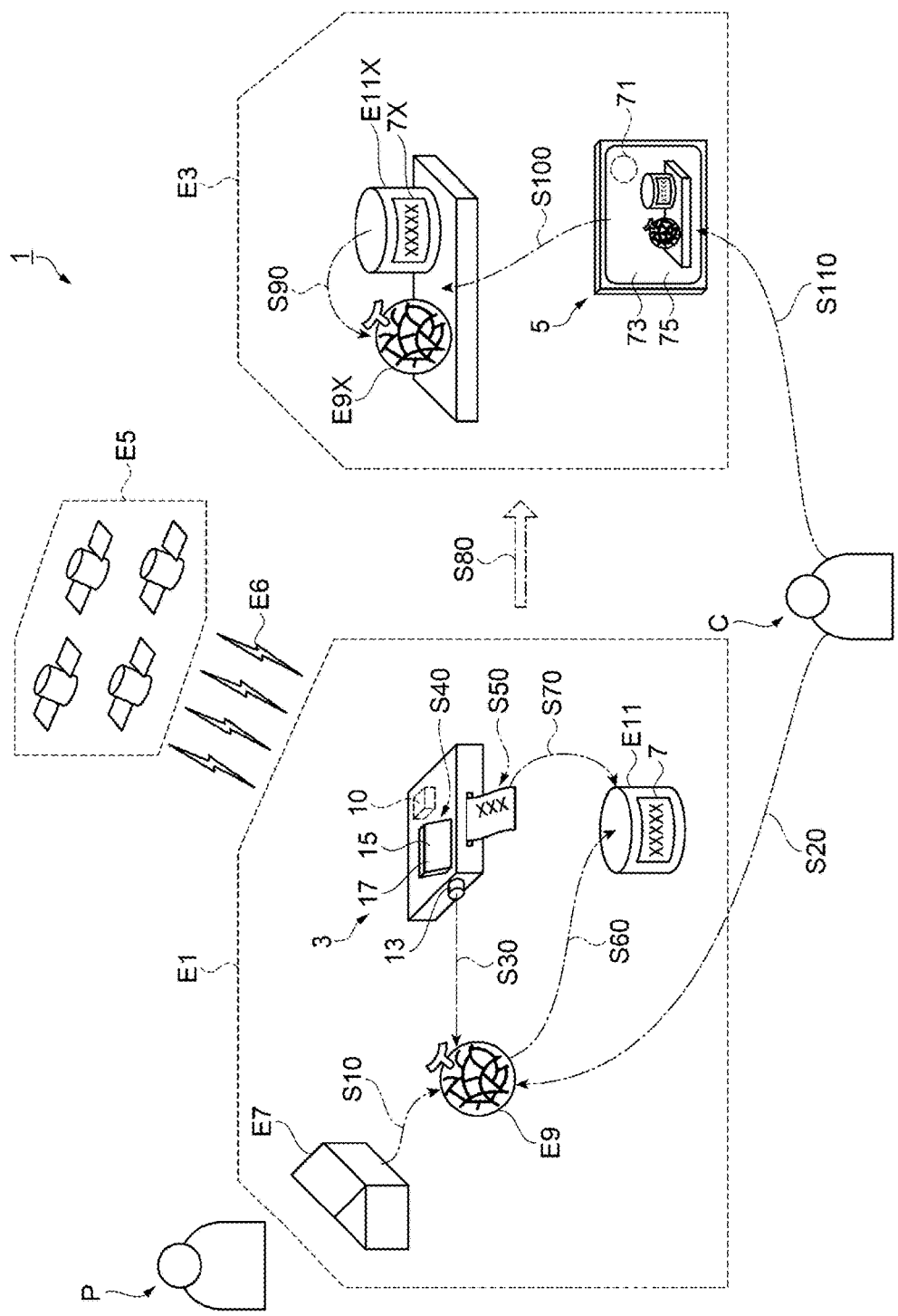
FIG. 1 is an explanatory diagram illustrating an overview of a label verification system.

An exemplary embodiment of the present invention will be described below with reference to the accompanying drawings. Note that, in the drawings below, to make the components and screens to have a recognizable size, the components and screens are illustrated to be different from an actual scale.

Exemplary Embodiment 1

(Overview of Label Verification System)

Figure 4:
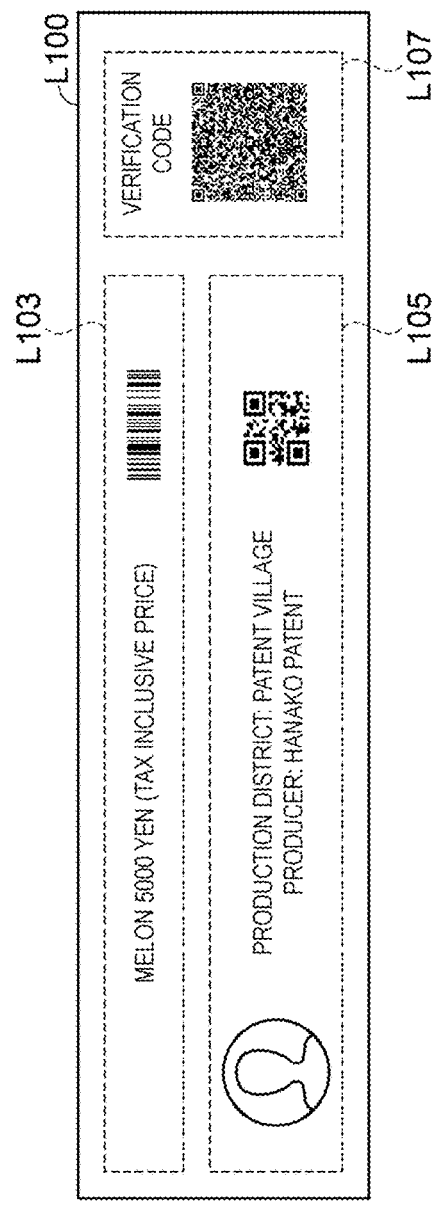
FIG. 4 is a diagram illustrating an example of a merchandise label.

FIG. 1 is an explanatory diagram illustrating an overview of a label verification system. FIG. 4 is a diagram illustrating an example of a merchandise label.

A label verification system 1 is an example of a system used for a direct service from a producer in which agricultural commodities are sold or sent directly from the producer. The direct service from a producer is the service in which, in a farm or similar where agricultural commodities are directly sold, commodities are sold to customers who visit the farm, and directly sent (sent articles) to the customer's house, etc. A customer directly checks a melon or a watermelon, for example, that has been harvested in the farm to select the most favorite one with his/her own sensibility. The customer then purchases one or more commodities and follows the procedure of requesting delivery to the customer's house. The customer does not need to carry the agricultural commodities purchased in the travel destination with him/her during the travel. The producer in the farm sends the merchandise selected by the customer to the customer's house while an appropriate state of preservation for the merchandise (including temperature and humidity) is kept. In such a farm, the service in which the customer is allowed to look over the state of the agricultural commodities before harvest in a hothouse, select his/her favorite agricultural commodities on the spot, and send the agricultural commodities to the customer's house in consideration of the right time to eat, has been conceived.

An overview of the label verification system 1 will be described by following a flow of operations of the direct service from a producer with reference to FIG. 1. The label verification system 1 includes a label writer 3 and an information device 5.

The direct service from a producer is a service provided in a place such as a farm field E1 and a customer's house E3. The farm field E1 corresponds to a general farm, in which a hothouse E7 for growing agricultural commodities is provided. In the farm field E1, a direct sales store for selling agricultural commodities is provided next to the hothouse E7. The producer P harvests agricultural commodities from the hothouse E7 (harvesting operation S10), and then exhibits a merchandise E9, for example, in the direct sales store. The merchandise E9 is an example of an article. A customer C visits the farm field E1 (the direct sales store) for the purpose of sightseeing, for example, and looks around for a souvenir to be purchased among the agricultural commodities. The customer C then determines purchasing the merchandise E9 (decision operation S20). The producer P operates the label writer 3 by following the operation procedure and creates the merchandise label 7. In the operation procedure, the merchandise E9 is imaged (imaging operation S30), the customer C is prompted to input the customer information unique to the customer such as a secret identification code and a key word (customer information input operation S40), and a merchandise label 7 is printed (printing operation S50). In the customer information input operation S40, the customer information is carefully input to prevent a peep from other people including the producer P. Subsequently, the merchandise E9 is packed into an individual box E11 (box packing operation S60), the merchandise label 7 that has been printed is attached to the individual box E11 (labeling operation S70). These operations performed by the producer P (S30 to S70) may be performed under confirmation of the customer C. At least until the printing operation S50 in which the merchandise label 7 is printed, attendance of the customer C increases the reliability of verification in the label verification system 1. The operations till the printing operation S50 require relatively short operation time. Therefore, this is an effective system for customers having a limited time, in particular, such as the customer C who acts as a group, for example. The system enables the customer C to purchase the merchandise in a short time, and the merchandise can be delivered with high reliability.

The individual box E11 in which the merchandise E9 is contained and to which the merchandise label 7 is attached is transported to the customer's house E3 by a forwarding agent (transportation operation S80).

In the customer's house E3, the individual box E11 X to which a merchandise label 7X is attached by the customer C is unpacked, and a merchandise E9X is taken out (taking out operation S90). Subsequently, an operation is performed, in which whether verification the delivered merchandise E9X is the merchandise E9 purchased by the customer C is determined.

The customer C starts up a program 99 for verification (to be described later) in the information device 5 and operates with an operation unit 75 by following the operation procedure. Firstly, the merchandise E9X and the merchandise label 7X are imaged by the imaging unit 71 (imaging operation S100). Once they are imaged, a determination result is displayed on a display 73. The customer C observes the display 73 and confirms the determination result (confirmation operation S110). The determination result includes the results related to whether the merchandise is identical or whether the customer information of the customer C is identical. In a case where the merchandise and the customer information of the customer C are both identical, the identity is verified.

An identification process is performed in the information device 5 after an image is acquired in the imaging operation S100. Next, the mechanism of verifying the identification will be described.

The label writer 3 prints the verification code on the merchandise label 7. The verification code is the image data of a two-dimensional code such as a QR Code (registered trademark) in which information such as characters and/or numerals are patterned. The label writer 3 patterns characteristic information and customer information. The characteristic information is generated by analyzing a characteristic (unique characteristics such as a pattern, a color, and a size) related to the merchandise E9 from the imaged merchandise E9. The customer information is a secret identification code, for example, input by the customer C. The label writer 3 then generates image data. Subsequently, the label writer 3 prints the image data on the merchandise label 7. That is, in the merchandise label 7, the characteristic information which identifies the merchandise E9 and the customer information known by the customer C alone are included.

The information device 5 images the delivered merchandise E9X (at this time, whether it is the merchandise E9 is unknown) and an image of the merchandise label 7X (at this time, whether it is the merchandise label 7 is unknown). From the part of the verification code in the image data in which the merchandise label 7X has been imaged, the customer information and the characteristic information of the merchandise are extracted (decoded). Firstly, whether the extracted customer information matches the customer information input by the customer C when purchasing the merchandise E9 (this information is remembered by the customer C) is determined. In a case where they match each other, the merchandise E9X is verified to be the merchandise addressed to the customer C.

Subsequently, in the information device 5, the characteristics are analyzed from the image data in which the merchandise E9X is imaged, and then the characteristic information is generated. The obtained characteristic information of the merchandise E9X is then compared with the characteristic information extracted from the verification code of the merchandise label 7X. In a case where they are determined to match each other, the merchandise E9X and the merchandise E9 selected by the customer C are verified to be identical.

As described above, in the label verification system 1, through the medium of the merchandise label 7, the merchandise E9 itself selected by the customer C in the farm field E1 is verified to have been delivered to the customer's house E3. That is, the merchandise E9 and the delivered merchandise E9X are verified to be identical.

In FIG. 1, a positioning satellite E5 is illustrated. The label writer 3 includes a positioning unit 10 to receive a positioning signal E6 from the positioning satellite E5. The positioning unit 10 calculates location information of the label writer 3 itself from the positioning signal E6. In the label writer 3, in addition to the characteristic information and the customer information that have been added in generating the above-described verification code, the location information is added. The information added as described above is patterned to generate image data of the verification code. In the information device 5, the location information may be extracted from the verification code that has been imaged, and the production district where the merchandise E9 is harvested may be informed to the customer C.

Hereinafter, a configuration of the label verification system 1 for achieving the above advantages will be described in detail.

(Configuration of Label Writer)

Figure 2:
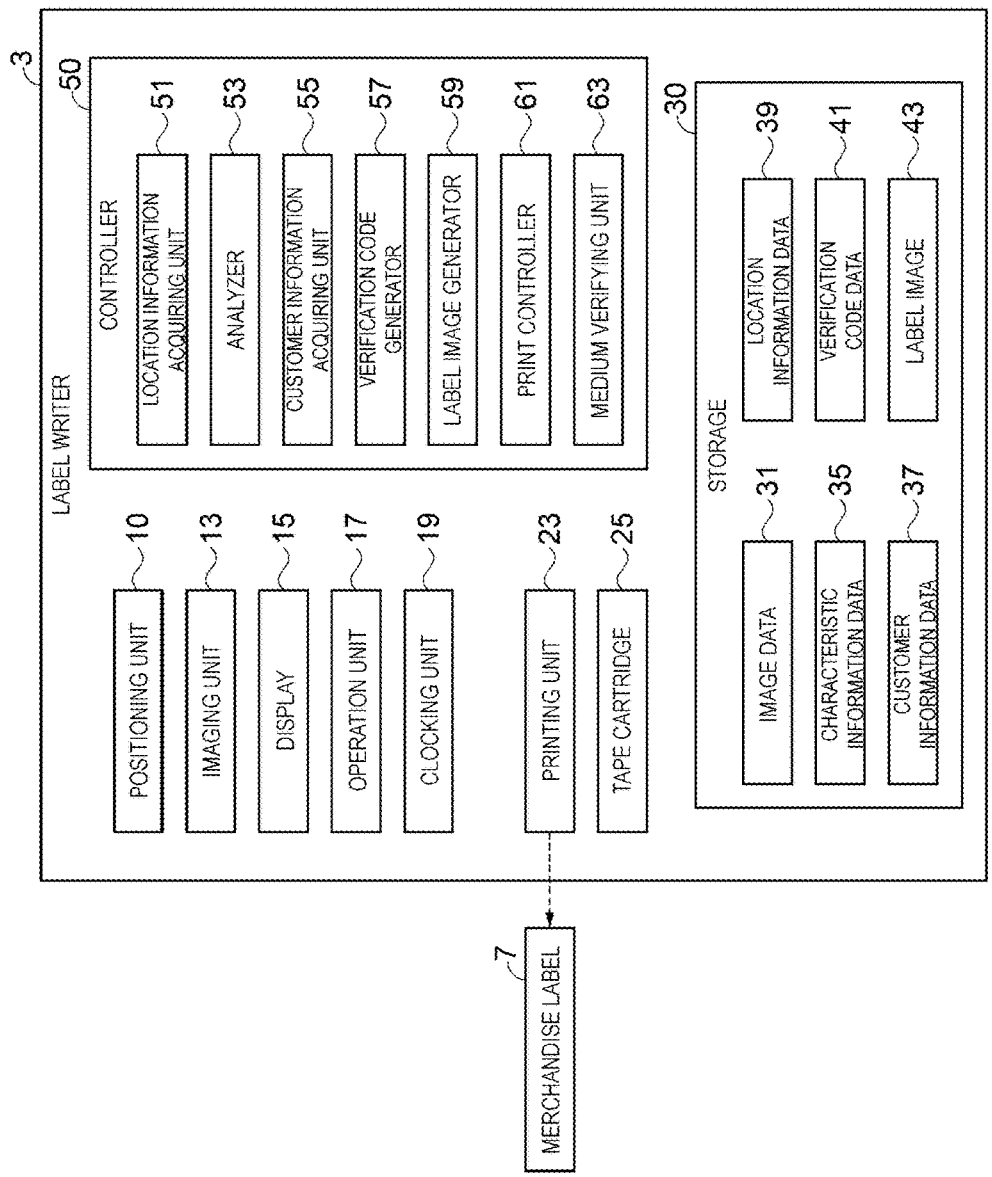
FIG. 2 is a block diagram illustrating a schematic configuration of a label writer.

FIG. 2 is a block diagram illustrating a schematic configuration of the label writer.

The label writer 3 includes the positioning unit 10, an imaging unit 13, a display 15, an operation unit 17, a clocking unit 19, a printing unit 23, a tape cartridge 25, a storage 30, and a controller 50. From the label writer 3, the merchandise label 7 is output as a label. The label writer 3 corresponds to a label creating device.

The positioning unit 10 includes a sensor unit and an antenna unit, and a location information calculating unit (not illustrated). The sensor unit and the antenna unit receive positioning information from a global navigation satellite system (GNSS) for positioning. The positioning unit 10 outputs the location information of the label writer 3. The location information includes a latitude, a longitude, and an altitude, which are calculated for every unit time (every second, for example). The calculated location information is stored in the storage 30 as location information data 39.

The imaging unit 13 is a charge coupled device (CCD) sensor, for example, and performs photoelectric conversion on an amount of light detected to generate an imaging signal (an image signal). The image signal is dissolved into signals of RGB colors through a color film, for example. The image signal is then stored in the storage 30 as image data 31. The image data 31 is stored having a value of 0 to 255, for example, for gradation values based on the amount of light detected for each pixel arranged in a matrix to represent each color. In the imaging unit 13, a CMOS sensor may be used.

The imaging unit 13 includes an auto-focus function, an automatic exposure function, automatic shutter speed function, and an automatic lighting function. The imaging unit 13 determines an optimum focusing, brightness, and saturation for the subject. The imaging unit 13 is capable of outputting the image data 31 in which the outline, patterns on the surface, a shape, and colors of the subject are clearly represented even in a detailed part.

The imaging unit 13 may be configured to image not only a still picture but also a moving picture. The imaging unit 13 corresponds to an imaging unit in apparatus. The subject clearly represented corresponds to a first subject. The image data 31 corresponds to first image data.

The display 15 includes a display panel such as a general liquid crystal display (LCD). The display 15 is a display which performs various types of displays based on display signals received from the controller 50.

The operation unit 17 is an input unit including an operation button and a touch panel. The operation unit 17 outputs signals of the operation button and/or the touch panel that have been operated on the operation button and/or the touch panel (by pressing down the button and/or tapping, etc.) to the controller 50. The operation unit 17 may be a keyboard or a mouse. On this occasion, the operation unit 17 outputs signals of the keyboard and/or the mouse that have been operated to the controller 50.

The clocking unit 19 is a real-time clock including a timer function, a clock function, a stopwatch function, and a clocking function for occurrence of a specified time period for calculating the location information by the positioning unit 10.

The printing unit 23 includes a print head, a tape transporting unit, and a tape cutter (none of them are illustrated). The printing unit 23 prints an image output from the controller 50 onto a tape supplied from the tape cartridge 25 and thus generates a label.

The print head is a line print head which performs printing by inserting a tape and an ink ribbon into a space between the print head and a platen roller, that is, by a thermal transfer method. In the print head, a lot of thermal transfer elements (about 360 elements per inch, for example) are arranged in the tape-width direction. The tape transporting unit includes a motor and a conveyance roller. The tape transporting unit transports the tape from a tape cartridge 25 (to be described later) to the print head. After the print head forms (prints) dots that correspond to print data on the tape, the tape transporting unit transports the tape from the print head to an outlet (not illustrated). The tape cutter includes a tape cutter and its drive portion. In the state the conveyance of the tape is temporarily stopped, the tape cutter cuts the portion already printed on the tape in the tape-width direction. The data of a label image 43 (to be described later) generated by the controller 50 is entirely formed in dots on the tape, then cut, and thus a label is completed.

The tape cartridge 25 stores the tape in a roll shape and detachably installed to the label writer 3. The tape cartridge 25 is provided for each tape width and for each color on the tape surface. One type of the tape cartridge 25 is a duplication preventing tape cartridge which allows the tape in which patterns for preventing duplication are arranged to be supplied.

The storage 30 includes storages such as ROM (Read Only Memory), flash ROM, RAM (Random Access Memory), an HDD (Hard Disk Drive), and an SSD (Solid State Drive). The storage 30 stores various types of programs for implementing functions of the controller 50, various types of data, and various types of files. The storage 30 also includes a storage area for display such as a VRAM (Video RAM), a storage area for editing to edit the label image 43 (to be described later), and a work area for temporarily storing data in process of various types of processing, values of variables, and results of processing.

The storage 30 stores the image data 31, characteristic information data 35, customer information data 37, the location information data 39, verification code data 41, and the label image 43.

The image data 31 is the image data of a subject imaged in the imaging unit 13, and stored in a bitmap format, for example. In the image data 31, imaged data of a subject (the above-described merchandise E9, for example) is included. Out of the image data 31, the data portion of the subject is focused on, and thus the data portion of the subject is clearly imaged.

The characteristic information data 35 is the data indicating the characteristic information unique to the subject imaged in the image data 31. The characteristic information data 35 is the data indicating the analyzed result of a subject portion (a subject area) of the image data 31 analyzed by an analyzer 53 which will be described later. The analyzer 53 is capable of analyzing the characteristic information in the subject area by using a plurality of analysis techniques. In the characteristic information data 35, the names of the analysis techniques that have been used and the characteristic information which is the analyzed result for each of the techniques. The format of the data stored in the characteristic information data 35 varies for each of the techniques that have been used for analysis. For example, as for the data format, a series of data are stored as a set, including an analysis technique ID (Identifier), a threshold of characteristic quantity, and relative coordinate values of a characteristic point exceeding the threshold. For another example, a series of data are stored as a set, including the analysis technique ID, a pixel block of characteristic shape after edge processing, relative coordinate values of the pixel block.

The customer information data 37 is the data indicating the customer information unique to the customer. The customer information data 37 includes character data such as a secret identification code and a key word, which are acquired from the customer C by controlling the operation unit 17 by the customer information acquiring unit 55. The customer information data 37 may also include image data of a signature of the customer C recognized on the touch panel, or a plurality of vector data coupled to each other.

The customer information data 37 is deleted from the storage 30 after the verification code is printed by a printing unit 23 which will be described later. Through this process, in the label writer 3, the customer information data 37 is prevented from being reused.

The customer information data 39 is the data indicating the location information of the label writer 3. The location information calculated by the positioning unit 10 for every unit time is stored. Specifically, information including the latitude, the longitude, the altitude, and the like is stored along with the time of positioning in every second, for example.

In the verification code data 41, the image data such as a two-dimensional code in which the information of characters and/or numerals is patterned as described above is stored in a bitmap format, for example. The verification code data 41 is generated by the verification code generator 57 and stored in the storage 30. The size of the verification code data 41 is determined according to a print resolution of the printing unit 23 and a tape width specified for printing.

The label image 43 is the image data of the merchandise label 7 to be printed on the tape. In the label image 43, a name of the merchandise, a price of the merchandise, a merchandise code, information of a producer, and the above-described verification code data 41 are stored in the storage 30 in a state they are arranged on memory. The size of the label image 43 is determined based on the tape width used for printing and the print resolution of the printing unit 23. For example, when the tape width is 36 mm and the print resolution is 360 dpi (dot per inch), about 510 dots can be formed in the tape-width direction. Therefore, for the size of the label image 43 in the tape-width direction, a size of 510 pixels is ensured. Note that this size is provided for ensuring the optimum print quality and not limited to this example. Depending on the size of the storage area included in the storage 30, a smaller size may be provided.

The controller 50 includes a processor such as a CPU (Central Processing Unit) and a DSP (Digital Signal Processor). The controller 50 generally controls the components included in the label writer 3, such as the positioning unit 10, the imaging unit 13, the display 15, the operation unit 17, the clocking unit 19, the printing unit 23, and the storage 30.

The controller 50 includes a location information acquiring unit 51, an analyzer 53, a customer information acquiring unit 55, the verification code generator 57, a label image generator 59, a print controller 61, and a medium verifying unit 63, as functional units. These functional units are merely examples and may or may not be included. In addition, other functional units may be included.

The location information acquiring unit 51 acquires the location information of the label writer 3. Specifically, the location information acquiring unit 51 reads the time of positioning stored for every unit time, and the location information (such as the latitude, the longitude, and the altitude) from the storage 30. The location information acquiring unit 51 acquires the location information at the time of positioning closest to the current time acquired from the clocking unit 19. In a case where the time in positioning closest to the current time exceeds a specific time period (10 minutes, for example), the location information acquiring unit 51 controls the positioning unit 10 to acquire the location information again.

The analyzer 53 detects the subject area imaged in the image data 31 and analyzes the characteristics of the subject.

The analyzer 53 stores the analyzed characteristic information of the subject in the storage 30 as the characteristic information data 35.

The analyzer 53 firstly selects a pixel group representing a shape of the subject in the subject area from the image data 31. The subject area is detected with a publicly known method such as an edge detection method or a region segmentation method. The analyzer 53 extracts the characteristic information of the subject out of the detected subject area. The analyzer 53 includes a plurality of analysis techniques in which the characteristic information of the subject is extracted. These analysis techniques are achieved by reading a program (not illustrated) stored in the storage 30. In these program, a plurality of analysis techniques are preliminarily described in a programming language and stored in the storage 30 in a binary format which is executable in the controller 50. The analysis techniques adopted are publicly known methods such as an SIFT (Scale Invariant Feature Transform) method, an SURF (Speeded Up Robust Features) method, and a BRIEF (Binary Robust Independent Elementary Features) method. The techniques for analyzing the characteristic information are not limited to the above-described examples. For another example, a method of detecting a characteristic based on tendency of color distribution in a pixel group in the subject area, or a method of extracting characteristic portion of patterns and outlines of the subject with edge detection may be adopted. By adopting a plurality of types of analysis techniques as described above, the merchandise is exactly analyzed and the characteristic information unique to the merchandise is derived. For example, when the merchandise is a muskmelon, although it is an identical type of muskmelon, a mesh pattern on the surface differs one by one. The characteristic for each one is separately derived and distinguished from each other.

The analyzer 53 stores the name of the analysis technique for identifying the analysis technique adopted and the data of the characteristic information output by the analysis technique in the storage 30 as characteristic information data 35 in the data format according to the analysis technique. The name of the analysis technique may be an analysis technique ID. In a later-described merchandise analyzer 105 in the information device 5, the name of the analysis technique and the analysis technique ID in common are managed.

The analyzer 53 corresponds to a first analyzer, and the characteristic information data 35 corresponds to a first characteristic information in the label creating device.

The customer information acquiring unit 55 acquires customer information which is the information unique to the customer. The customer information acquiring unit 55 then stores the acquired customer information in the storage 30 as the customer information data 37.

The customer information acquiring unit 55 controls the operation unit 17 and the display 15 to prompt the customer C to directly input the information unique to the customer. Specifically, the customer information acquiring unit 55 displays Message (1) to the customer C on the display 15, and thus prompts the customer C to input the customer information from the operation unit 17.

"Please input the information unique to the customer with numerals or characters. This information is used when receiving the merchandise". Message (1).

As described in Message 1, the customer information input by the customer C is used in the information device 5 when receiving the merchandise, as the information used for checking.

The customer information acquiring unit 55 corresponds to a first identification information acquiring unit, and the customer information data 37 corresponds to a first identification information in the label creating device.

The verification code generator 57 causes the location information, the characteristic information, and the customer information to be image-patterned and thus generates (image data of) the verification code. Exemplary examples of the verification code include a two-dimensional bar code such as a QR Code. The verification code generator 57 encodes the information according to an encoding technique determined by each code protocol. After that, the verification code generator 57 converts the encoded information into image patterns.

The verification code generator 57 receives the inputs of the location information acquired by the location information acquiring unit 51, the characteristic information analyzed by the analyzer 53, and the customer information acquired by the customer information acquiring unit 55, and then couples the information. On this occasion, lossless compression or encryption may be applied to such information. The verification code generator 57 encodes the coupled information according to an encoding procedure, generates the image patterns, and generates the image data of the verification code. The verification code generator 57 stores the generated image data in the storage 30 as the verification code data 41.

Note that a decoding procedure corresponding to the encoding procedure adopted in the verification code generator 57, a decompression process, and a decryption process are implemented in a later-described label analyzer 107 of the information device 5.

The verification code data 41 corresponds to code information, and the verification code generator 57 corresponds to a generator.

The label image generator 59 generates a label image to be printed on the tape as a label medium. Specifically, the label image generator 59 arranges the verification code to be printed on the tape, the name of the merchandise, the price of the merchandise, the merchandise code, the information of the producer, in an area of the label image 43 of the storage 30.

The print controller 61 outputs the data arranged in the label image 43 to the printing unit 23. Once entire data of the label image 43 is printed, the print controller 61 outputs an instruction command for cutting the tape to the printing unit 23. In the printing unit 23, once the label image 43 is printed, the tape is cut and thus the merchandise label 7 is complete.

The medium verifying unit 63 includes a function which controls the tape cartridge 25 installed to the label writer 3 and achieves a process according to the type of the tape cartridge 25. Specifically, in the label writer 3 used in the label verification system 1, the tape used as the tape cartridge 25 is limited to a duplication preventing tape which prevents duplication. The medium verifying unit 63 is configured to control such that in a case where the installed tape cartridge 25 is detected as a duplication preventing tape cartridge, printing the label image 43 is possible, otherwise, an alert message indicating that printing is impossible is displayed on the display 15 to disable printing.

(Merchandise Label)

Next, the merchandise label 7 to be output from the printing unit 23 will be described.

FIG. 4 is a diagram illustrating an example of the merchandise label.

A label L100 is an example of the label completed by printing the label image 43 on the tape surface by the print controller 61 and the printing unit 23 and then cutting the tape by the tape cutter.

The label L100 includes three print areas L103, L105, and L107.

The print area L103 is an area for printing the merchandise information. In the print area L103, "MELON" as a name of the merchandise, "5000 YEN (TAX INCLUSIVE PRICE)" as a price of the merchandise, and a barcode pattern such as a universal merchandise code (JAN/EAN/UPC code) as a merchandise code are printed.

The print area L105 is an area for printing the information related to the producer and the production district. In the print area L105, a QR Code is printed in which the information is patterned such that an image of the face of the producer; "PATENT VILLAGE" as the production district information; "HANAKO PATENT" as the name of the producer, and a uniform resource locator (URL) of the web page related to the producer and the production district.

The print area L107 is an area for printing the verification code. In the print area L107, the verification code generated by the verification code generator 57 is printed.

The merchandise label 7 is attached to an individual box of a target merchandise. In the merchandise label 7 that has been delivered to the customer C along with the target merchandise, the verification code is included. The verification code includes the characteristic information of the merchandise selected by the customer C, the customer information known by the customer C alone, and the location information of the place where the merchandise is harvested. The merchandise label 7 including the verification code is present between the customer C and the producer P. The merchandise label 7 allows determination of whether the delivered merchandise includes a characteristic of the merchandise selected by the customer C, whether the delivered merchandise is the merchandise related to the customer C, or whether the production district of the merchandise is the production district of the merchandise that the customer C purchased. That is, presence of the merchandise label 7 itself enables the customer C to have a high reliance on the producer P and thus purchase the merchandise with trust. In addition, the presence of the merchandise label 7 itself enables the producer P to acquire high reliability.

(Information Device)

Figure 3:
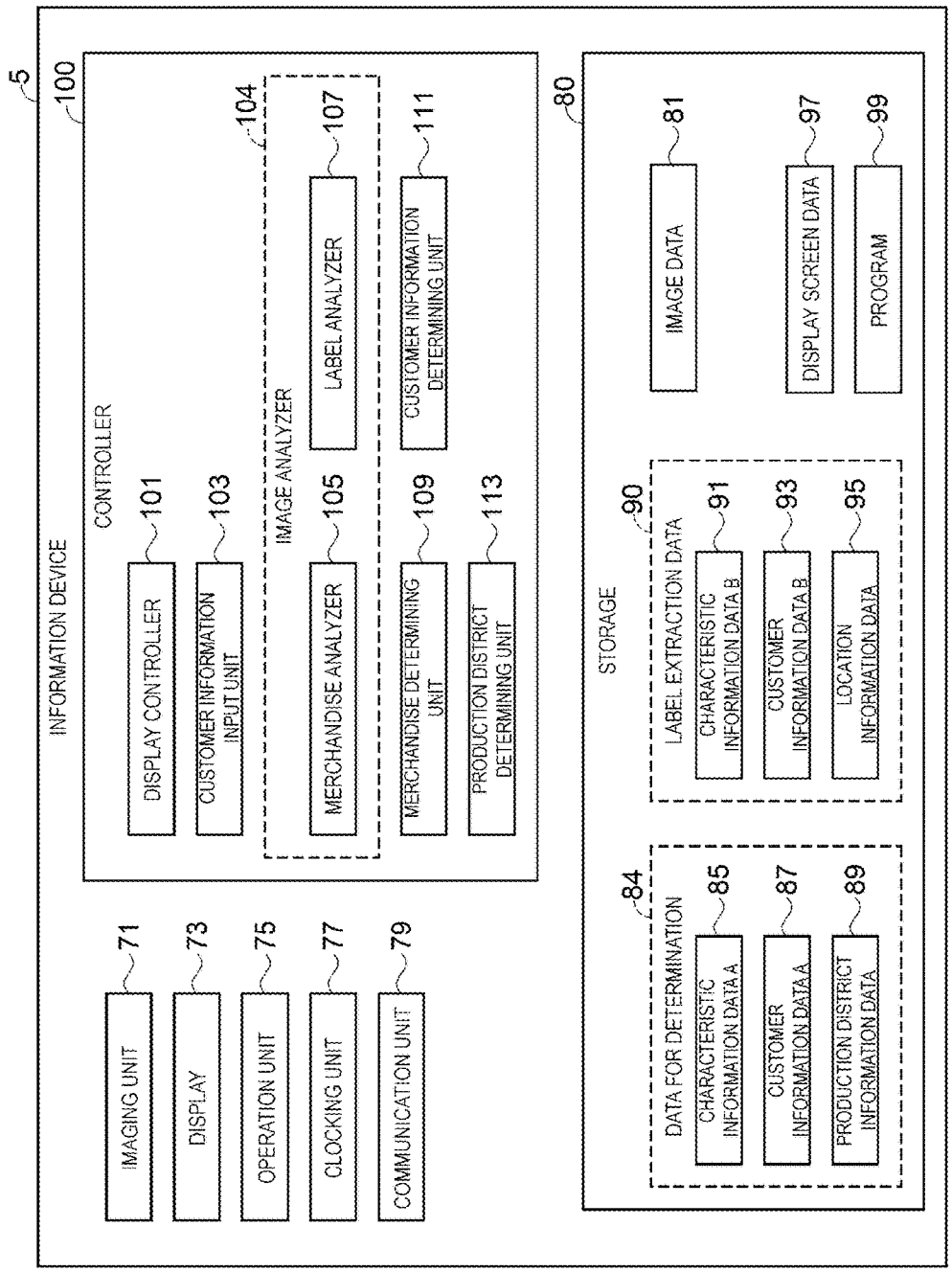
FIG. 3 is a block diagram illustrating a schematic configuration of an information device.

FIG. 3 is a block diagram illustrating a schematic configuration of the information device.

The information device 5 is a general smart phone, tablet terminal, and personal computer (PC), for example. The information device 5 includes an imaging unit 71, a display 73, the operation unit 75, a clocking unit 77, a communication unit 79, a storage 80, and a controller 100. In the storage 80 of the information device 5, a program 99 is stored. The program 99 is read by the controller 100 and executed, and thus the information device 5 functions as the information device 5 in the label verification system 1.

The imaging unit 71 is a CCD sensor, for example, and performs photoelectric conversion on an amount of light detected to generate an imaging signal (an image signal). The image signal is dissolved into signals of RGB colors through a color film, for example. The image signal is then stored in the storage 80 as image data 81. In the imaging unit 71, a CMOS sensor may be used.

The imaging unit 71 corresponds to a device imaging unit in device.

The display 73 is a display including an LCD, etc. The display 73 performs various types of display processes based on a display signal output from the controller 100 (a display controller 101). On the display 73, the image data imaged by the imaging unit 71, display screen data 97, etc., are displayed.

The operation unit 75 is an input unit including a touch panel arranged on the display 73. The operation unit 75 outputs operation signals of the touch panel that have been operated on the touch panel (by tapping, etc.) to the controller 100.

The clocking unit 77 is a real-time clock including a timer function, a calendar function, and a clocking function. The clocking data such as date and time, or a time period clocked by the clocking unit 77 are read by the controller 100.

The communication unit 79 is a communication adapter for mobile communication and a wireless local area network (LAN), a short distance wireless adapter, or a wired communication adapter. The communication unit 79 may be connected to a mobile telecommunications network, a general intranet communication network, or the Internet communication network.

The storage 80 includes storages such as the ROM, the flash ROM, the RAM, the HDD, and the SSD. The storage 80 stores various types of programs for achieving functions of the controller 100, various types of data, and various types of files. The storage 80 also includes the storage area for display such as the VRAM and a work area for temporarily storing data in process of various types of processing, values of variables, and results of processing.

In the storage 80, the image data 81, the data for determination 84, the label extraction data 90, the display screen data 97, and the program 99 are stored.

The image data 81 is the image data of a subject imaged in the imaging unit 71, and stored in a bitmap format, for example. In the image data 81, imaged data of the subject (such as the merchandise and the verification code) is included. Out of the image data 81, the data portion of the subject is focused on, and thus the data portion of the subject is clearly imaged. After the image data 81 in which the subject is clearly imaged is determined, other portions of the image data may be deleted from the storage 80. In addition, as the image data 81, a plurality of image files may be stored for each of the subjects. That is, an image file for the merchandise imaged as the subject, and an image file for the verification code imaged as the subject, for example, may be stored as the image data 81.

The image data 81 corresponds to second image data, and the subject included in the image data 81 corresponds to a second subject.

The data for determination 84 and the label extraction data 90 are data compared with each other. By comparing both the data, the identity of the merchandise is verified.

The label extraction data 90 is the data extracted from the portion in which the verification code of the image data 81 is imaged. The label extraction data 90 includes characteristic information data B 91, customer information data B 93, and location information data 95. The characteristic information data B 91, the customer information data B 93, and the location information data 95 are the data in which the contents corresponding to the characteristic information data 35, the customer information data 37, the location information data 39 stored in the storage 30 in the label writer 3 are developed, respectively.

The data for determination 84 includes characteristic information data A 85, customer information data A 87, and the production district information data 89. The characteristic information data A 85 in which the characteristic information analyzed from the image data portion where the merchandise is imaged in the data of the image data 81 is stored. The customer information data A 87 is the customer information acquired from the customer C through the operation unit 75, for example.

The production district information data 89 is a table file in which the information of the production district name corresponding to certain location information (the latitude, the longitude, and the altitude) is stored.

The display screen data 97 is the data of the display screen generated by the display controller 101. The data of the display screen is output to the display 73 by the display controller 101, and thus displayed. The screen D100 illustrated in FIG. 5 and the screen D130 illustrated in FIG. 6 are examples of the display screen data 97.

The program 99 is read by the controller 100 and executed, and thus achieves the function of the information device 5 in the label verification system 1. The flow processed by executing the program 99 will be described later with reference to FIG. 8.

The controller 100 includes a processor such as a CPU and a DSP. The controller 100 generally controls the components included in the information device 5, such as the imaging unit 71, the display 73, the operation unit 75, the clocking unit 77, the communication unit 79, and the storage 80.

The controller 100 includes a display controller 101, a customer information input unit 103, an image analyzer 104, a merchandise determining unit 109, a customer information determining unit 111, and a production district determining unit 113, as functional units. These functional units are merely partial and may or may not be included. In addition, other functional units may be included.

The display controller 101 generates the display screen data 97 to be displayed on the display 73, and outputs the display screen data 97 to the display 73. Once the display controller 101 controls the operation unit 75 to input the operation signal from the touch panel, the display controller 101 controls the operation unit 75 to output a predetermined display screen to the display 73 and display the display screen, according to the operation signal.

The display screen data 97 to be generated includes a screen D100 (FIG. 5) and a screen D130 (FIG. 6). The screen configuration of these screens will be described later.

The customer information input unit 103 acquires customer information which is the information unique to the customer. Specifically, the customer information input unit 103 controls the operation unit 75 and the display 73 via the display controller 101 to prompt the customer C to input the customer information. When inputting the customer information with characters and/or numerals, etc., ends, the customer information input unit 103 stores the customer information that has been input in the data for determination 84 in the storage 80 as the customer information data A 87.

The customer information input unit 103 corresponds to second identification information acquiring unit, and the customer information data A 87 corresponds to the second identification information.

The image analyzer 104 analyzes the image data 81 that has been imaged, and outputs the information included in the image data 81. The image analyzer 104 detects the subject imaged in the image data 81. In the image data 81 (this may include a plurality of files), at least the merchandise and the verification code included in the merchandise label 7 are included as the subject. The image analyzer 104 detects the subject areas where the respective subjects are imaged. The image analyzer 104 includes the merchandise analyzer 105 and the label analyzer 107 as functional units.

The merchandise analyzer 105 analyzes the subject area of the merchandise, etc., included in the image data 81, and analyzes the characteristic information. The merchandise analyzer 105 stores the characteristic information of the subject that has been analyzed in the data for determination 84 in the storage 80 as the characteristic information data A 85.

To the technique for analyzing the subject area of the merchandise, etc., the technique adopted in the analyzer 53 in the label writer 3 is applied. The program in which the technique similar to the analysis technique used for the label writer 3 is described, is stored in the storage 80 in a format executable in the controller 100 of the information device 5. This configuration achieves obtaining the result in which, for an identical merchandise, the characteristic information analyzed by the analyzer 53 (the label writer 3) and the characteristic information analyzed by the merchandise analyzer 105 match each other, or resemble each other with high probability.

The merchandise analyzer 105 corresponds to the second analyzer, and the characteristic information data A 85 corresponds to the second characteristic information.

The merchandise analyzer 107 analyzes the subject area of the verification code included in the image data 81, and extracts the information included in the verification code. The verification code includes the characteristic information, the customer information, and the information with characters and/or numerals, etc., of the location information that have been image-patterned by the verification code generator 57 in the label writer 3. In the label analyzer 107, the image pattern encoded in the verification code generator 57 is decoded, and the data of characters and/or numerals, etc., are extracted. In a case where the image pattern is compressed or encrypted, a decompression process or a decryption process is applied to.

The label analyzer 107 stores the characteristic information, the customer information, and the location information that have been extracted in the label extraction data 90 in the storage 80, as the characteristic information data B 91, the customer information data B 93, and the location information data 95, respectively.

The label analyzer 107 corresponds to an extracting unit. The characteristic information data B 91 corresponds to the first characteristic information in the information device, and the customer information data B 93 corresponds to the first identification information in the information device.

The merchandise determining unit 109 determines whether the merchandise is identical based on the characteristic information of the merchandise. Specifically, the merchandise determining unit 109 compares the characteristic information data A 85 and the characteristic information data B 91 with each other. In a case where they have a matching ratio of equal to or larger than a specific ratio, the merchandise determining unit 109 determines they are identical. The specific ratio is, for example, about 80%. Specifically, in a case where a series of data values stored for the respective analysis technique IDs present in the characteristic information data B 91 match the data values of the characteristic information data A 85 with a matching ratio equal to or larger than 80%, the merchandise determining unit 109 determines that the characteristic information is identical (matches) and thus determines the merchandise as an identical item. In a case where the characteristic information data A 85 and the characteristic information data B 91 have a matching ratio smaller than 80%, the merchandise determining unit 109 determines that the characteristic information is not identical (does not match) and that the merchandise is not identical. The determined result is displayed on the display 73 via the display controller 101.

In a case where it is determined that the merchandises are not identical, a step to prompt the customer C to image the merchandise again may be added. On this occasion, turning the merchandise to change the position for imaging may increase the matching ratio. After the position for imaging is changed, the characteristic information data A 85 and the characteristic information data B 91 are compared with each other. In a case where the matching ratio is still smaller than 80%, for example, the state of the matching ratio may be displayed on the display 73 via the display controller 101. On this occasion, a message "The probability of matching of the merchandise is about 60%", for example, is displayed.

The merchandise determining unit 109 corresponds to the characteristic information determining unit.

The customer information determining unit 111 determines (checks for determination) whether the customer information is identical. Specifically, the customer information determining unit 111 compares the customer information data A 87 and the customer information data B 93 with each other. Only in a case where the customer information data A 87 and the customer information data B 93 match each other perfectly, the customer information determining unit 111 determines that they are identical. In a case where they do not match each other, even slightly, the customer information determining unit 111 determines that they are not identical. The determined result is displayed on the display 73 via the display controller 101.

The customer information determining unit 111 corresponds to an identification information determining unit.

The production district determining unit 113 determines whether the production district is correct based on the location information. Specifically, out of the location information (the latitude, the longitude, and the altitude) acquired from the location information data 95, the production district determining unit 113 acquires information of the production district as geographical information corresponding to the location information with reference to the production district information data 89. The production district determining unit 113 displays the acquired production district information on the display 73 via the display controller 101. In addition, the production district determining unit 113 prompts the customer, via the display controller 101, to input whether the displayed production district information is the production district of the merchandise the customer has purchased (ordered). When the customer inputs that it is the production district, the production district determining unit 113 determines that the production district is correct. When the customer inputs that it is not the production district, the production district determining unit 113 determines that the production district is not correct. The determined result is displayed on the display 73 via the display controller 101.

(Display Screen of Information Device)

Figure 5:
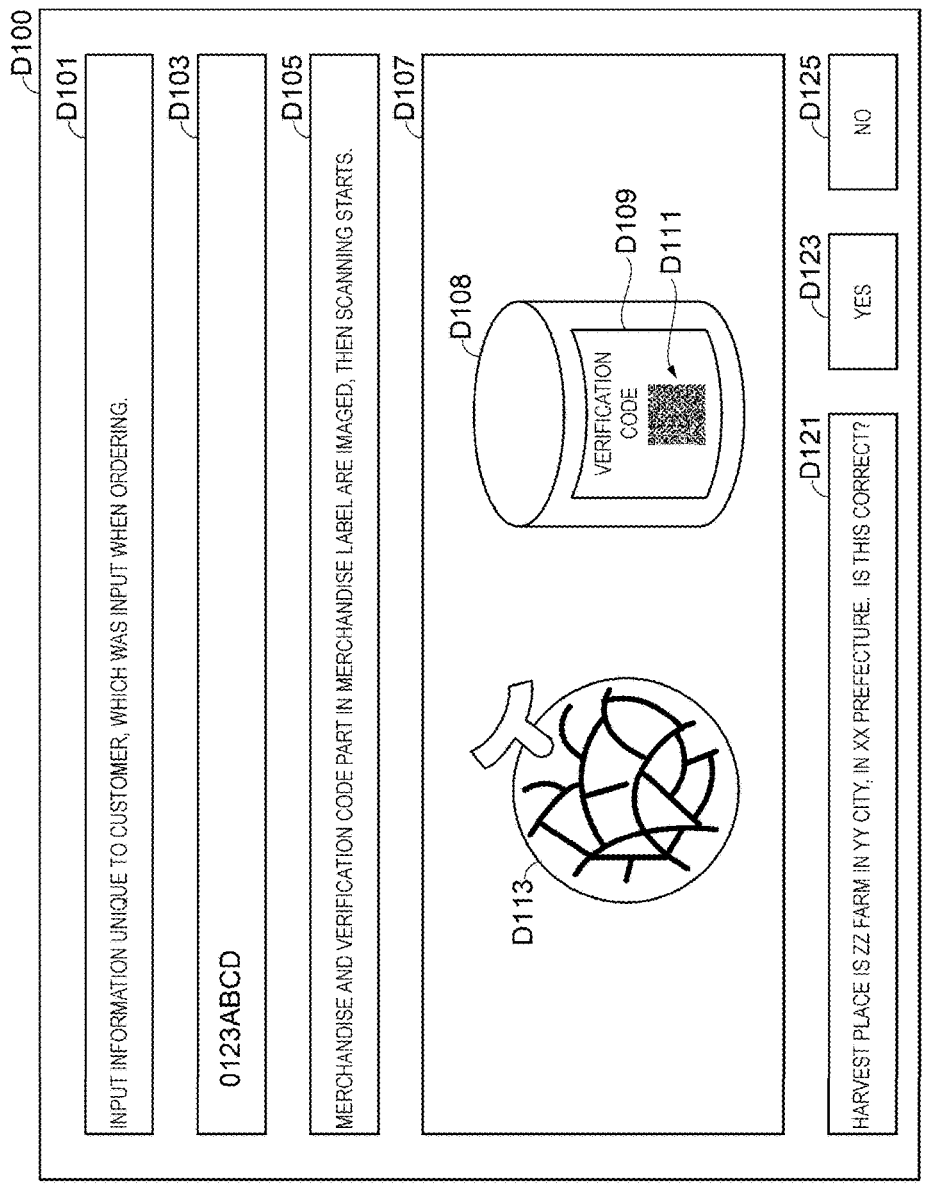
FIG. 5 is a diagram for illustrating a display screen of the information device.
Figure 6:
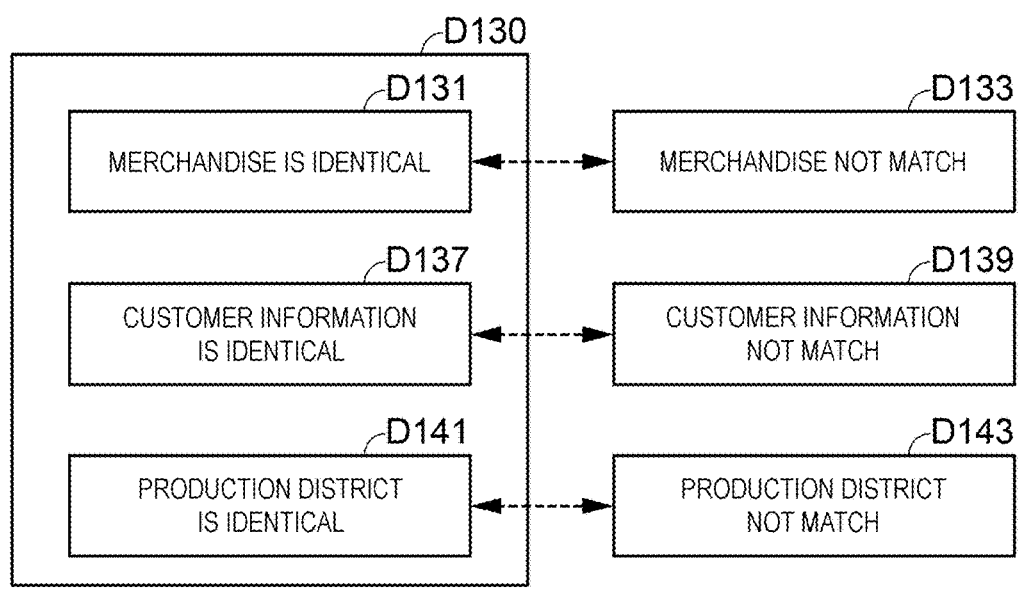
FIG. 6 is a diagram for illustrating a display screen of the information device.

FIGS. 5 and 6 are diagrams for illustrating display screens of the information device.

The screen D100 illustrated in FIG. 5 is a display screen displayed on the display 73 through a control by the display controller 101 of the information device 5. The screen D100 is a main screen displayed when the program 99 is read by the controller 100 and executed.

The screen D100 includes display areas D101, D105, and D121, an input area D103, an imaging screen area D107, and buttons D123 and D125.

The display area D101 is an area for displaying a message to prompt the customer who is an operator of the information device to input the customer information. The message "INPUT INFORMATION UNIQUE TO CUSTOMER, WHICH WAS INPUT WHEN ORDERING" is displayed.

The input area D103 is an area for inputting the customer information. "0123ABCD" which was input by the customer is displayed. In the input area D103, the characters and/or numerals that have been input via the operation unit 75 such as the touch panel are displayed.

The display area D105 is an area for displaying a message to instruct the customer to image an image of the subject (the merchandise and the verification code). The message "MERCHANDISE AND VERIFICATION CODE PART IN MERCHANDISE LABEL ARE IMAGED, THEN SCANNING STARTS." is displayed. The message instructs the customer to put the images of the merchandise and the verification code part in the merchandise label 7 in the imaging screen area D107.

The imaging screen area D107 is an area for displaying an image being imaged by the imaging unit 71. In the imaging screen area D107, an image acquired with a specific frame rate, such as 60 frames per second (fps), is displayed and updated. At the timing when the subject analyzable is displayed in the acquired image, update of the image displayed in the imaging screen area D107 ends, and the image is displayed as a still picture.

In the example illustrated in FIG. 5, subject areas D113, D108, D109, and D111 are displayed in the imaging screen area D107. The subject area D113 is an image area where the merchandise is displayed as the subject. The subject area D108 is an image area where the individual box in which the merchandise has been packed is displayed. The subject area D109 is an image area where the merchandise label 7 is displayed. The subject area D111 is an image area where the verification code is displayed.

In this example, at the timing when the subjects to be analyzed in the subject area D113 and D111 are clearly displayed, the image is displayed as a still picture.

The display area D121 is an area for displaying the information related to the production district of the merchandise. The message "HARVEST PLACE IS ZZ FARM IN YY CITY, IN XX PREFECTURE. IS THIS CORRECT?" is displayed. In this example, as the information of the production district, the farm where the merchandise is harvested and its location are displayed.

The buttons D123 and D125 are button widgets for allowing the customer C to input whether the production district of the merchandise displayed in the display area D121 is correct. The button D123 is the button to be selected when the production district is correct. "YES" is displayed on the top of the button. The button D125 is the button to be selected when the production district is not correct. "NO" is displayed on the top of the button.

The screen D130 illustrated in FIG. 6 is displayed after the screen D100 (FIG. 5) is displayed. The screen D130 is the screen displaying the identity of the merchandise, the determination result whether the customer information is identical, and whether the production district is correct.

In the screen D130, display contents D131, D133, D137, D139, D141, and D143 may be displayed.

The display contents D131 and D133 are the determination results related to the identity of the merchandise. In a case where the merchandise is identical, the message "MERCHANDISE MATCH" is displayed as illustrated in the display content D131. In a case where the merchandise is not identical, the message "MERCHANDISE NOT MATCH" is displayed as illustrated in the display content D133.

The display contents D137 and D139 are the determination results of whether the customer information is identical. In a case where the customer information is identical, the message "CUSTOMER INFORMATION MATCH" is displayed as illustrated in the display content D137. In a case where the customer information is not identical, the message "CUSTOMER INFORMATION NOT MATCH" is displayed as illustrated in the display content D139.

The display contents D141 and D143 are the determination results of whether the production district is correct. In a case where the production district is correct (in a case where the production district of the merchandise purchased matches the harvest place), the message "PRODUCTION DISTRICT MATCH" is displayed as illustrated in the display content D141. In a case where the production district is not correct, the message "PRODUCTION DISTRICT NOT MATCH" is displayed as illustrated in the display content D143.

(Print Process of Merchandise Label in Label Writer)

Figure 7:
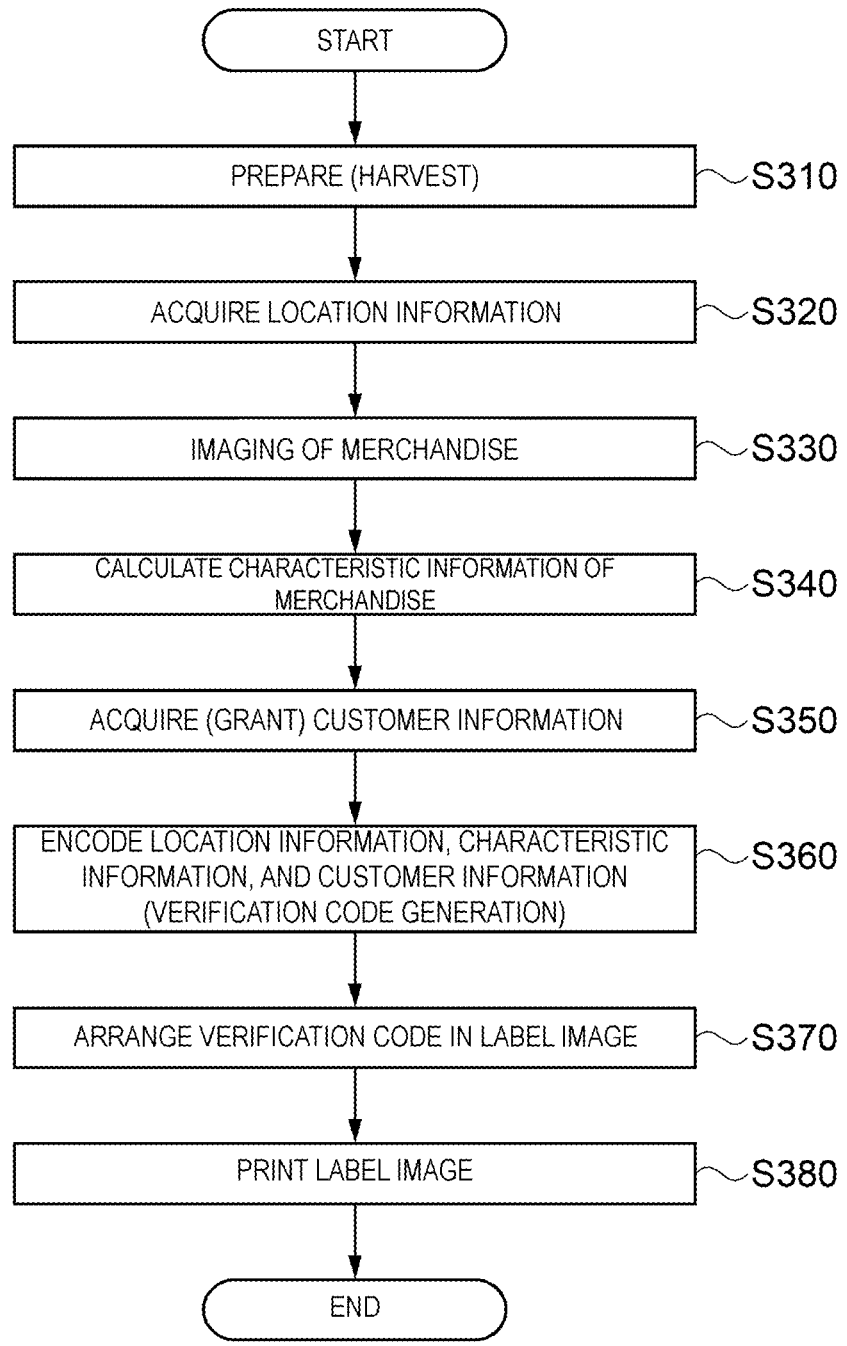
FIG. 7 is a flowchart illustrating a flow of a print process of the merchandise label.

FIG. 7 is a flowchart illustrating a flow of a print process of the merchandise label. This flow is a process executed by controlling the components such as the positioning unit 10 and the imaging unit 13 by the controller 50 based on the program (not illustrated) included in the storage 30 in the label writer 3.

Step S310 is a preparation. Specifically, the label writer 3 is started up and placed in or near the harvest place of the target merchandise. The label writer 3 may be carried with the producer who performs the harvesting operation.

In Step S320, the location information is acquired. Specifically, the positioning unit 10 is controlled to acquire the location information. The acquired location information is stored in the storage 30 as the location information data 39.

In Step S330, an image of the merchandise is acquired. Specifically, the imaging unit 13 is controlled to image the merchandise selected by the customer C. The imaged data is stored in the storage 30 as the image data 31.

In Step S340, the characteristic information of the merchandise is calculated. Specifically, the subject area where an image of the subject is imaged in the image data 31 is analyzed and the characteristic information is calculated. The calculated characteristic information is stored in the storage 30 as the characteristic information data 35.

In Step S350, the customer information is acquired. Specifically, the display 15 and the operation unit 17 are controlled to allow the customer to input the customer information unique to himself/herself. The input customer information is stored in the storage 30 as the customer information data 37.

In Step S360, the location information, the characteristic information, and the customer information are encoded, and thus the verification code is generated. Specifically, the information acquired in Step S320 to S350, that is, the location information, the characteristic information, and the customer information are image-patterned, and thus the image data of the verification code is generated.

In Step S370, the verification code is arranged in the label image. Specifically, the image data of the verification code generated in Step S360 is arranged in the label image 43 which is a work area for generating a design of the merchandise label 7 stored in the storage 30.

In Step S380, the label image is printed. Specifically, the data of the label image 43 is output to the printing unit 23. From the printing unit 23, the merchandise label 7 on which the label image 43 is printed on the tape is output.

Through the flow as described above, the location information of the harvest place, the characteristic information of the merchandise, the customer information of the customer who has purchased (ordered) are acquired, and then the verification code readably patterned from the information is generated.

(Identification Process with Merchandise Label in Information Device)

Figure 8:
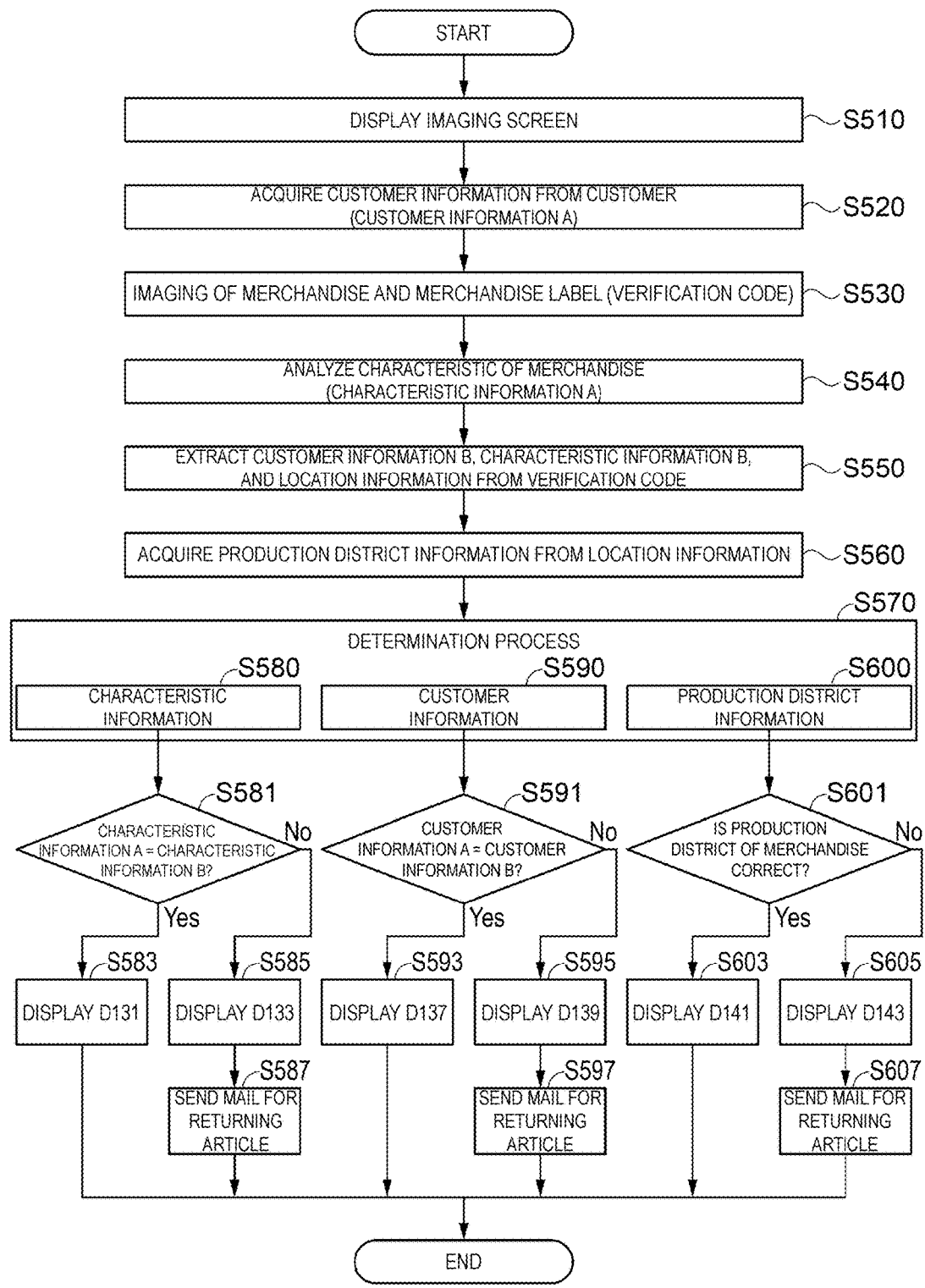
FIG. 8 is a flowchart illustrating a flow of an identification process with the merchandise label.

FIG. 8 is a flowchart illustrating a flow of an identification process with the merchandise label. This flow is a process executed by controlling the components such as the imaging unit 71, the display 73, and the operation unit 75 by the controller 100 based on the program 99 in the information device 5. The description is made with reference to mainly FIG. 8, and also FIGS. 5 and 6.

In Step S510, the imaging screen is displayed. The image acquired by the imaging unit 71 is displayed on the display 73. The imaging screen area D107 in the screen D100 illustrated in FIG. 5 corresponds to an imaging screen.

In Step S520, the customer information (customer information A) is acquired from the customer. Specifically, the display 73 and the operation unit 75 are controlled to prompt the customer C to input the customer information unique to the customer. Once the customer information is input, the customer information is stored in the characteristic information data A 85 in the storage 80. In the screen D100, the display area D101 is displayed and the information including characters and/or numerals that have been input in the input area D103 are acquired.

In Step S530, the merchandise and the merchandise label (the verification code) are imaged. Specifically, it is detected that the merchandise and the verification code part in the merchandise label 7 are put in the imaging screen displayed in Step S510, and clearly imaged. When it is detected, the image data is stored in the storage 80 as the image data 81.

In Step S540, the characteristic of the merchandise (the characteristic information A) is analyzed. Specifically, the subject area of the merchandise, etc., included in the image data 81 is analyzed and the characteristic information is analyzed. The analyzed characteristic information of the subject is stored in the characteristic information data A 85 in the storage 80.

In Step S550, the customer information B, the characteristic information B, and the location information are extracted from the verification code. Specifically, the subject area of the verification code included in the image data 81 is analyzed, and the customer information (the customer information B), the characteristic information (the characteristic information B), and the location information included in the verification code are extracted. Each of the acquired information is stored in the label extraction data 90 in the storage 80.

In Step S560, the production district information is acquired from the location information. Specifically, out of the location information (the latitude, the longitude, and the altitude) acquired from the location information data 95, information of the production district corresponding to the location information is acquired with reference to the production district information data 89. The acquired information of the production district is output to the display 73. In the screen D100, content of the display area D121 is displayed.

In Step S570, a determination process is performed. The determination process includes three types of determination processes: the determination process of the characteristic information (Step S580); the determination process of the customer information (Step S590); and the determination process of the production district information (Step S600). All of the determination processes are performed.

In Steps S580 to S587, the determination process of the characteristic information is performed.

In Step S581, the determination whether the characteristic information A and the characteristic information B match each other is performed. In a case where it is determined that they match each other (Yes), the procedure goes to Step S583. In a case where it is determined that they do not match each other (No), the procedure goes to Step S585. The determination whether the characteristic information A and the characteristic information B match each other is performed such that in a case where the contents of the information match with a matching ratio equal to or larger than 80%, it is determined that they are identical, and in a case where the contents of the information match with a matching ratio smaller than 80%, it is determined that they are not identical.

In Step S583, the display content D131 indicating that the merchandise is identical (FIG. 6) is displayed.

In Step S585, the display content D133 indicating that the merchandise is not identical is displayed.

In Step S587, a mail for returning the article is sent. Specifically, the mail message describing the difference information between the characteristic information A and the characteristic information B, and the determination result indicating that the merchandise is not identical is automatically generated. The generated mail message is sent to the mail address of the producer P. In this step, the mail may be sent without confirmation of the customer C.

In Step S590, the determination whether the customer information A and the customer information B match each other is performed. In a case where it is determined that they match each other (Yes), the procedure goes to Step S593. In a case where it is determined that they do not match each other (No), the procedure goes to Step S595. The determination whether the customer information A and the customer information B match each other is performed such that in a case where the contents of the information match perfectly, it is determined that they are identical, and in a case where the contents of the information are different, even slightly, the input is retried several times. Then, in a case where the contents of the information do not matches perfectly, it is determined that they are not identical.

In Step S593, the display content D137 indicating that the customer information is identical is displayed.

In Step S595, the display content D139 indicating that the customer is not identical is displayed.

In Step S597, a mail for returning the article is sent. Specifically, the mail message is generated, which includes the result indicating that the customer information A and the customer information B do not match each other, and the number of retries. And then the mail message is sent to the mail address of the producer P. In this step, the mail may be sent without confirmation of the customer C.

In Step S601, the determination whether the production district is correct is performed. In a case where it is determined that the production district is correct (Yes), the procedure goes to Step S603. In a case where it is determined that the production district is not correct (No), the procedure goes to Step S605. The determination whether the production district is correct is performed based on the answer by the customer C to the information of the production district displayed in Step S560. Specifically, when the button D123 in the screen D100 is pressed down, it is determined that the production district is correct. When the button D125 is pressed down, it is determined that the production district is not correct.

In Step S603, the display content D141 indicating that the production district is correct is displayed.

In Step S605, the display content D143 indicating that the production district is not correct is displayed.

In Step S607, a mail for returning the article is sent. Specifically, the mail message is generated, which includes information of the location information and the production district information, and information of the selected button. And then the mail message is sent to the mail address of the producer P. In this step, the mail may be sent without confirmation of the customer C.

Through the flow in the information device 5 as described above, by imaging the code in the merchandise label 7 generated in the label writer 3, along with the delivered merchandise, the determination of the identity of the merchandise, the determination whether the customer information is identical, and the determination whether verification the production district is correct, are possible.

In the flows illustrated in FIGS. 7 and 8, the determination whether the production district of the merchandise (the harvest place) is correct is performed. In a case where the production district of the merchandise is not necessarily verified, this process may be omitted. On this occasion, the encoding process of the location information in Steps S310, S320, and S360 is omitted. Therefore, the location information is not included in the verification code. Also, in Step S550, the extracting process of the location information and Step S560, Steps S600 to S607 are omitted from the verification code. Therefore, verifying process of the production district based on the location information is omitted.

As described above, with the label verification system 1, the label writer 3, and the information device 5 according to the embodiment, the following advantageous effects are obtained.

The label writer 3 analyzes the merchandise imaged by the imaging unit 13 by using analyzer 53, and derives the characteristic information indicating a characteristic of the merchandise. The characteristic information is derived with a plurality of types of analysis techniques to seize a characteristic unique to the merchandise. The derived characteristic information is delivered to the information device 5 through the medium of the verification code printed on the merchandise label 7. In the information device 5, the determination whether verification the characteristic information of the merchandise that has been delivered and the characteristic information extracted from the code match each other is performed. As described above, the merchandise imaged by the label writer 3 is verified to be identical to the delivered merchandise.

However, it cannot be verified whether the merchandise imaged by the label writer 3 is truly the merchandise selected and purchased (ordered) by the customer. For example, in a case where the merchandise is replaced by the producer P with a similar but different one from the merchandise selected by the customer C, because the merchandise is imaged by the label writer 3 and then the verification code is generated, therefore, in the information device 5, the verification code extracted from the characteristic information of the merchandise and the verification code match each other. To prevent such circumstances, the customer information unique to the customer is also added to the verification code. That is, at the time when the customer selects the merchandise, the customer information is input and the verification code is printed. After that, in a case where the merchandise is replaced with a different merchandise, the verification code on which the customer information is input cannot be printed. As described above, by using the label writer 3 and the information device 5, through the medium of the merchandise label 7 on which the code is printed, the authenticity of the delivered article is enabled for verifying whether the delivered article is the merchandise that has been selected by the customer.

Also, in the verification code, the location information in which a position is measured by the label writer 3 is added. The location information acquired from the positioning satellite is delivered to the information device 5 through the medium of the verification code. On the information device 5, the information related to the production district is displayed based on the time of positioning and/or the location information. As described above, whether the production district is correct is thus determined.

In addition, in the label verification system 1, between the label writer 3 and the information device 5, information of the characteristic information, the customer information, and the location information are transmitted by using the merchandise label 7 on which the verification code is printed. The label verification system 1 does not adopt any server system configured on a network. Therefore, the label verification system 1 is not liable to increase a cost on large scale system construction or an operation cost.

Note that the present invention is not limited to the exemplary embodiment described above, and various changes and modifications may be applied to the above-described exemplary embodiment. Modified examples will be described below.

Modification Example 1

In the above-described exemplary embodiment, the information acquiring unit 55 configured to acquire the customer information in the label writer 3 acquires the unique information that has been input by controlling the operation unit 17 and the display 15 as the customer information. However, the configuration is not limited to this example. For another example, the customer C may write a unique pattern on a slip of paper, and the pattern written on the paper may be acquired as the customer information.

Figure 9:
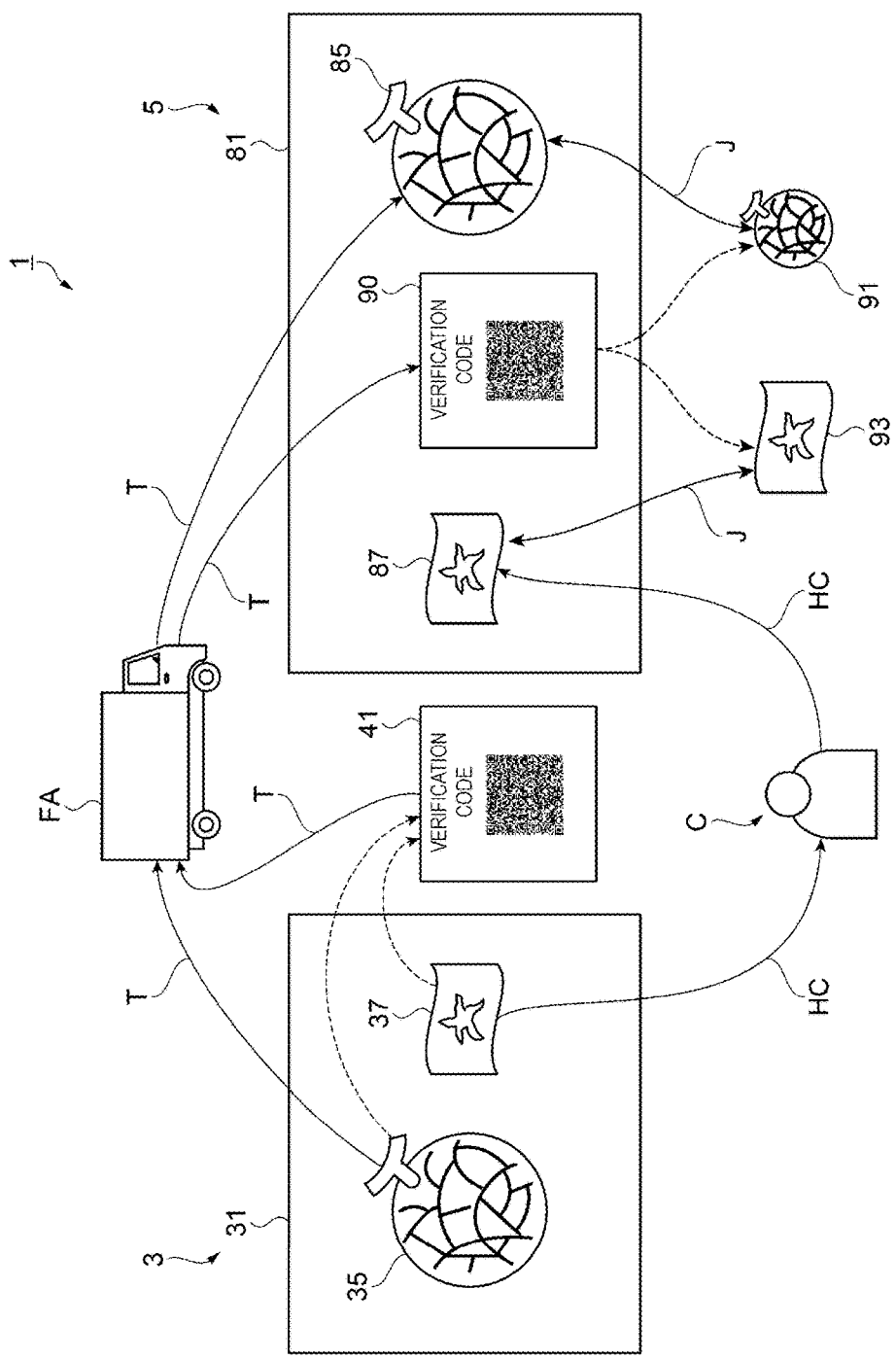
FIG. 9 is a diagram illustrating an overview of a label verification system according to a modified example.

FIG. 9 is a diagram illustrating an overview of a label verification system according to a modified example. Hereinafter, Modified Example 1 will be described with reference to mainly FIG. 9, and also FIGS. 2 and 3.

In FIG. 9, Modified Example 1 is illustrated with the image data 31 imaged in the label writer 3 and the image data 81 imaged in the information device 5 in the label verification system 1. The design patterns drawn respectively in the image data 31 and the image data 81 (35, 37, 87, 90, and 85) represent the subjects that have been imaged in their respective images.

In the label writer 3, the merchandise and a slip of paper are imaged in the image data 31 as the subject. For a merchandise image representing "melon", the characteristic information data 35 which is data of the characteristic information of the merchandise is illustrated. For a merchandise image representing "a slip of paper in which a handwriting star-shaped pattern is drawn", the customer information data 37 is illustrated which is data of the customer information unique to the customer C. The characteristic information data 35 and the customer information data 37 are patterned and the verification code data 41 is generated. The merchandise "melon" and the verification code on which the verification code data 41 is printed is transported T by a forwarding agent FA to the information device 5.

The customer information data 37 (the slip of paper), for which "a slip of paper in which a handwriting star-shaped pattern is drawn" is exemplified, is the slip of paper on which a picture or a symbol is drawn by the customer C in handwriting. It is not limited to a pattern, and a character or a numeral may be drawn. The label writer 3 images an image of the slip of paper along with the merchandise. The merchandise and the slip of paper that have been imaged are analyzed by the analyzer 53 for each of their characteristic information. In the analyzer 53, the characteristic information is obtained by analyzing the merchandise and used for generating the characteristic information data 35. In the analyzer 53, by the similar technique, the characteristic information is generated by analyzing the pattern of the slip of paper. The customer information acquiring unit 55 controls the imaging unit 13 and the analyzer 53 to generate the customer information data 37 from the characteristic information obtained by analyzing the pattern of the slip of paper.

The slip of paper on which the pattern is drawn is hand-carried HC by the customer C. That is, the slip of paper is not left to the label writer 3 (the side of the producer P). The slip of paper is held by the customer C, from bringing it back, receiving the merchandise, and then till using (imaging) it on the information device 5.

Once the merchandise and the merchandise label 7 (the verification code) are transported T by the forwarding agent FA, in the information device 5, the slip of paper that has been hand-carried HC by the customer C, the merchandise, and the verification code are imaged. As illustrated in the image data 81 in FIG. 9, the slip of paper, the verification code, and the merchandise are imaged as the subject. For the respective subjects, the slip of paper corresponds to the customer information data A 87 included in the data for determination 84 (FIG. 3), the verification code corresponds to the label extraction data 90, and the merchandise corresponds to the characteristic information data A 85 included in the data for determination 84. From the label extraction data 90 (the verification code), the customer information data B 93 and the characteristic information data B 91 are extracted, which have been generated, in the label writer 3, by the label analyzer 107. The characteristic information data A 85 is generated by analyzing the imaged merchandise by the merchandise analyzer 105.

The customer information data A 87 is generated by controlling the imaging unit 71 and the image analyzer 104 by the customer information input unit 103. Specifically, the customer information input unit 103 instructs the image analyzer 104 to analyze the characteristic information in the subject area on the slip of paper portion from the image data 81 imaged by the imaging unit 71. As an analyzed result, the characteristic information of patterns on the slip of paper is acquired, and then the characteristic information is used for generating the customer information data A 87.

The merchandise determining unit 109 determines J whether the characteristic information data A 85 and the characteristic information data B 91 match each other. In addition, the customer information determining unit 111 determines J whether the customer information data A 87 and the customer information data B 93 match each other. On this occasion, the customer information data A 87 and the customer information data B 93 are determined based on the characteristic information of their both patterns drawn on the slip of paper. As for a determination method, determination is performed, as in the determination method performed by the merchandise determining unit 109, based on a matching ratio of the characteristic information.

As described above, the pattern drawn on the slip of paper may be used for the customer information unique to the customer to determine whether the customer information is identical in the same manner as the above-described exemplary embodiment. In addition, in Modified Example 1, the customer information is not input to the label writer 3. Therefore, this is an effective method for the customer C who is reluctant to input the customer information. Furthermore, in Modified Example 1, the customer information is hand-carried HC by the customer C. This operation makes it difficult for the producer P to generate the customer information data 37 independently and recreate the verification code data 41. Therefore, this is also effective for preventing falsification on the side of the producer P.

Modification Example 2

In the above-described modified example, as the customer information, the pattern drawn on the slip of paper is exemplified, which can be easily hand-carried HC. However, the configuration is not limited to this example. Another component to be hand-carried HC by the customer C may be used. For example, a key of the customer's house or car, a key ring, a pen, or similar may be used. In addition, to use the characteristic information related to colors such as RGB information, a color plate, a color pen, or similar may be used.

Modification Example 3

In the above-described exemplary embodiment and modified examples, the information device 5 is described as an information device operated by the customer C in the customer's house. However, the use of the information device 5 is not limited to this example. For another example, the information device 5 may be an information device used by the forwarding agent. In such an example, a worker of the forwarding agent who delivers the merchandise may carry the information device 5 with him/her, and the worker may perform the verification of the merchandise when delivering the merchandise.

Modification Example 4

In the above-described exemplary embodiment and modified examples, agricultural commodities are exemplified as the target merchandise in the direct service from a producer. However, the target merchandise is not limited to the agricultural commodities. The target merchandise may be products of nature such as marine products (seafood in general) or hand-made foods (sweets, cakes, and smoked food). In addition, the target merchandise may be an article that has individual characteristics such as ceramic works and artworks. Furthermore, although the target merchandise is a ready-made article, it is a used article, scratches and stains serve as the characteristic information. Therefore, such an article may be used as the target article for verification similar to the verification in the label verification system 1.

CROSS REFERENCE TO RELATED APPLICATIONS

This application is a National Phase Entry of PCT/JP2016/086171, filed Dec. 6, 2018; which claims priority to Japanese Patent Application No. 2015-256071 filed on Dec. 28, 2015; the entire contents of both of which are incorporated by reference herein.

The invention claimed is:

1. A system configured to verify an identity of an article, the system comprising:
a label creating device configured to create a label associated with the article; and
an information device configured to acquire information used for verifying the identity of the article from a content of the label, wherein
the label creating device includes:
an imaging unit configured to image a first subject including the article, and to acquire first image data of the first subject;
a first analyzer configured to analyze a characteristic of the article in the first subject by using the first image data, and to generate first characteristic information;
a first identification information acquiring unit configured to acquire first identification information associated with the article and used for identifying the article;
a generator configured to generate code information including at least the first characteristic information and the first identification information; and
a printing unit configured to print the code information on a label medium, and to output the label, and
the information device includes:
a device imaging unit configured to image a second subject including the article and the code information, and to output second image data;
an extracting unit configured to extract the first characteristic information and the first identification information from the image data of the code information of the second subject included in the second image data;
a second analyzer configured to analyze a characteristic of the article of the second subject by using the second image data, and to generate the second characteristic information;
a second identification information acquiring unit configured to acquire second identification information to be checked with the first identification information extracted by the extracting unit;
a characteristic information determining unit configured to determine whether the first characteristic information and the second characteristic information match each other;
an identification information determining unit configured to determine whether the first identification information extracted by the extracting unit and the second identification information acquired by the second identification information acquiring unit match each other; and
a display controller configured to control a display to display a determination result determined by the characteristic information determining unit and the identification information determining unit.

2. A system configured to identity of an article, the system comprising:
a label creating device configured to create a label associated with the article;
an information device configured to acquire information used for verifying the identity of the article from a content of the label, wherein
the label creating device includes:
a location information acquiring unit configured to acquire location information of a place where the label is created;

an imaging unit configured to image a first subject including the article, and to acquire first image data of the first subject;

a first analyzer configured to analyze a characteristic of the article in the first subject by using the first image data, and to generate first characteristic information;

a first identification information acquiring unit configured to acquire first identification information associated with the article and used for identifying the article;

a generator configured to generate code information including at least the location information and the first characteristic information and the first identification information; and a printing unit configured to print the code information on a label medium, and to output the label, and the information device includes:

an device imaging unit configured to image a second subject including the article and the code information and output second image data;

an extracting unit configured to extract the location information, the first characteristic information, and the first identification information from the image data of the code information of the second subject included in the second image data;

a second analyzer configured to analyze a characteristic of the article of the second subject by using the second image data and generate the second characteristic information;

a second identification information acquiring unit configured to acquire second identification information used for collation and determination with respect to the first identification information extracted by the extracting unit;

a production district determining unit configured to acquire geographical information based on the location information and determine whether the geographical information match the production district of the article;

a characteristic information determining unit configured to determine whether the first characteristic information and the second characteristic information match each other;

an identification information determining unit configured to determine whether verify the first identification information extracted by the extracting unit and the second identification information acquired by the second identification information acquiring unit match each other; and a display controller configured to control a display to display a determination result determined by the characteristic information determining unit and the identification information determining unit.

3. A label creating device configured to create a label associated with an article, the label creating device comprising:

a device imaging unit configured to image a first subject including the article, and to acquire first image data of the first subject;

a first analyzer configured to analyze a characteristic of the article in the first subject by using the first image data, and to generate first characteristic information;

a first identification information acquiring unit configured to acquire first identification information associated with the article and used for identifying the article;

a generator configured to generate code information including at least the first characteristic information and the first identification information; and a printing unit configured to arrange and print the code information on a label medium, and to output the label.

4. A label creating device configured to create a label associated with an article, the label creating device comprising:

a location information acquiring unit configured to acquire location information of a place where the label is created;

a device imaging unit configured to image a first subject including the article, and to acquire first image data of the first subject;

a first analyzer configured to analyze a characteristic of the article in the first subject by using the first image data, and to generate first characteristic information;

a first identification information acquiring unit configured to acquire first identification information associated with the article and used for identifying the article;

a generator configured to generate code information including at least the location information, the first characteristic information, and the first identification information; and a printing unit configured to arrange and print the code information on a label medium, and to output the label.

* * * * *